Sept. 19, 1967      K. H. BEHR      3,342,354

FREIGHT HANDLING DEVICE

Filed Jan. 15, 1965      3 Sheets-Sheet 1

INVENTOR.
KARL H. BEHR

BY Kenyon & Kenyon

ATTORNEYS

Sept. 19, 1967   K. H. BEHR   3,342,354
FREIGHT HANDLING DEVICE

Filed Jan. 15, 1965   3 Sheets-Sheet 3

INVENTOR.
KARL H. BEHR
BY
Kenyon & Kenyon
ATTORNEYS 3,342,354
FREIGHT HANDLING DEVICE
Karl H. Behr, Princeton N.J., assignor to the trustee of
the Shes Trust, Karl H. Behr, trustee
Filed Jan. 15, 1965, Ser. No. 425,913
6 Claims. (Cl. 214—83.22)

This invention relates to freight handling devices. More particularly, this invention relates to freight handling devices having a movable front wall.

It has been customary in the handling of freight to provide a floor conveyor in trailer bodies which will convey the freight from the rear of the trailer body to the front of it. The freight is normally conveyed on the conveyor floor by means of pallets. Each pallet is either initially loaded with freight and then placed on the conveyor floor or the pallet is inititally placed on the conveyor floor and the freight placed on the pallet. In each case, the pallet is attached to the conveyor floor so that it will move with it. The securement of the pallet to the floor is accomplished by keying the pallet to the conveyor floor by means of a separable key or by using a corrugated pallet which can key it self to the conveyor floor.

Attempts have been made to insure the stability of the freight in a loaded trailer body by providing sectionalized conveyor floors with a partition wall between the sections of conveyor floors. Also, pallets have been used which are supplied with hinged back portions to prevent the freight from falling forward of the trailer body.

However, these attempts to insure freight stability in transit have reduced the amount of space for freight in the trailer bodies which is a distinct economical disadvantage for a hauler of goods. Further, the use of pallets has encumbered the loading of freight by limiting the bulk of the goods that can be conveyed and the amount of freight that can be conveyed.

Accordingly, it is an object of this invention to provide a trailer body with a movable front wall.

It is another object of this invention to provide a trailer body having a conveyor floor with a movable front wall.

It is another object of this invention to provide a trailer body of simplified design so that when used it does not impose a serious weight penalty upon the user.

It is another object of this invention to provide a trailer body which can convey large bulk loads on a conveyor floor.

Other objects and advantages of this invention will be understood by reference to the following specification and drawings in which.

Figure 1:
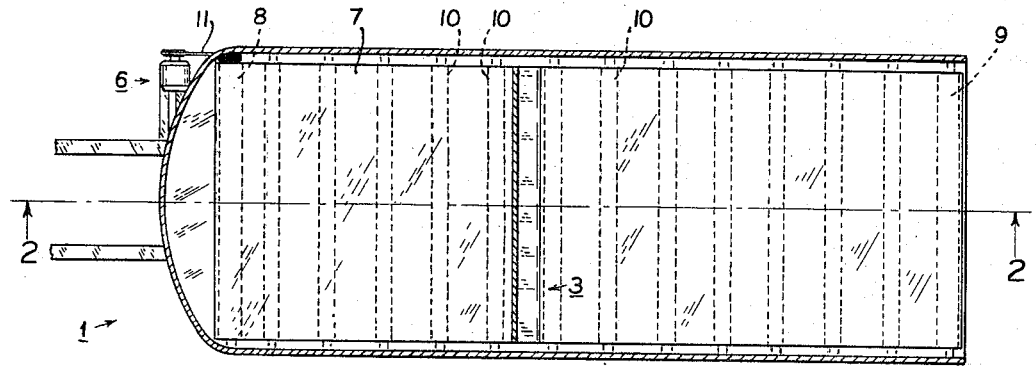
FIG. 1 is a plan view of a truck trailer having a movable front loading wall taken at line 1—1 of FIG. 2.
Figure 2:
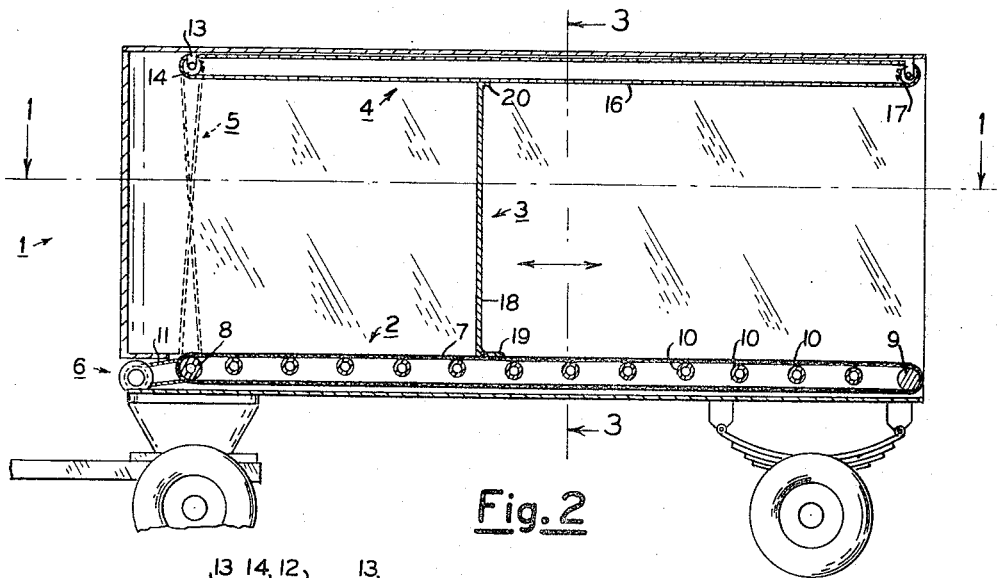
FIG. 2 is a side sectional view of the truck trailer of FIG. 1 taken at line 2—2 of FIG. 1.
Figure 3:
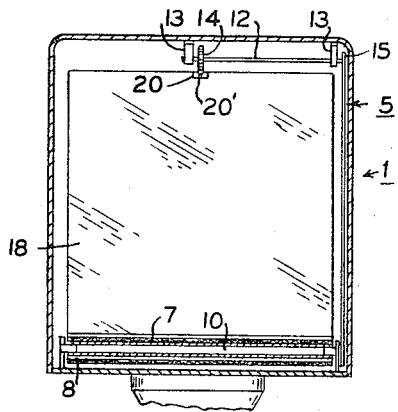
FIG. 3 is a transverse sectional view of the truck trailer of FIG. 1 taken at line 3—3 of FIG. 2.
Figure 4:
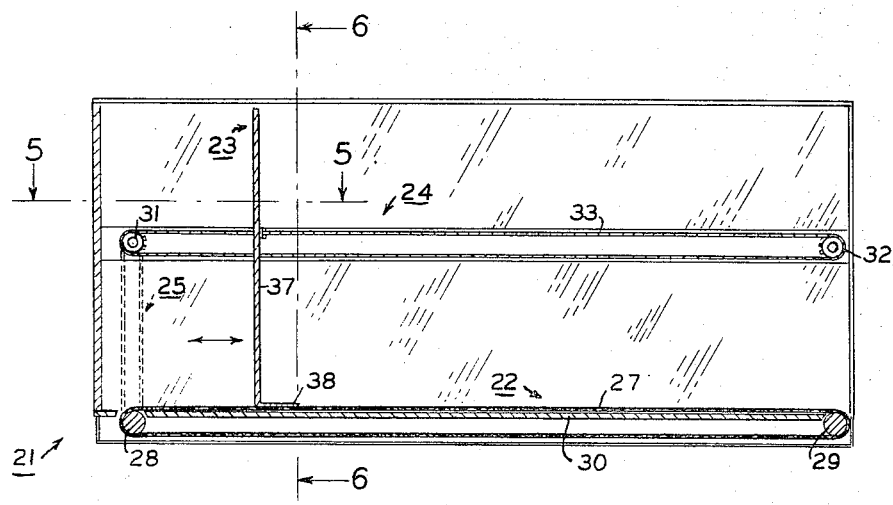
FIG. 4 is a side sectional view of an alternate truck trailer arrangement.
Figure 5:
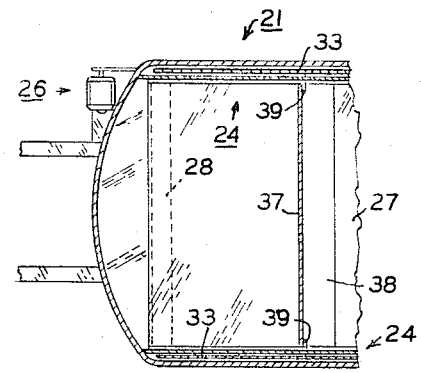
FIG. 5 is a partial plan view taken at line 5—5 of FIG. 4.

Referring to FIGS. 1 to 3, a standard truck trailer body 1 is provided with a conveyor belt floor assembly 2, a horizontally movable front wall 3, an overhead pulley assembly 4, drive chain 5 and a motor 6.

The conveyor belt floor assembly 2 has an endless conveyor belt 7 which extends almost the entire length of the truck trailer body 1 and which is rotatably mounted in a suitable manner on drive rollers 8, 9, one at each end thereof, respectively. Each drive roller 8, 9 is journalled at its ends in any suitable manner to the truck trailer body 1. A series of support rollers 10 are positioned between the drive rollers 8, 9 and serve to support the loads carried by the conveyor belt 7. In order to provide a greater load capacity, each support roller 10 can be made of a series of split rollers with bearings at their inner surfaces. The support rollers 10 are journalled at their ends in any suitable manner to the truck trailer body 1.

The conveyor belt floor assembly 2 is driven by means of the motor 6 which is mounted outside of the truck trailer body 1; however, the motor can also be mounted within the truck trailer body 1. The motor 6 is driven electrically either by the truck tractor alternator or by a regular A.C. power source. A chain 11 suitably connects the motor 6 to one end of the front end drive roller 8 so as to rotate the drive roller 8 upon actuation of the motor 6. As shown, when the motor 6 is outside the truck trailer body 1 a suitable opening is made in the floor of the truck trailer body 1 so that the chain 11 can connect with a drive sprocket on the front end drive roller 8.

The overhead pulley assembly 4 comprises a rotatable shaft 12 which is mounted in support brackets 13 on the roof of the truck trailer body 1 and which rotatably mounts a pair of sprockets 14 and 15 thereon. The overhead pulley assembly 4 further comprises an endless pulley belt 16 which by way of example is shown as a chain and which is suitably mounted on the sprocket 14 at one end and a second sprocket 17 at the other end.

It is noted that the overhead pulley assembly 4 can be modified in order to increase the headroom in the truck trailer body 1 by rotating the pulley belt 16 a quarter turn and using a suitable drive means therefor.

The drive chain 5 is suitably mounted on the front end drive roller 8 of the conveyor belt floor assembly 2, for example, by a fixed sprocket, and the front end sprocket 15 of the overhead pulley assembly 4 in a manner so that it effects movement of the conveyor belt 7 and pulley belt 16 in the same direction simultaneously upon actuation of the motor 6.

The movable front wall 3 is made of any material which will sustain impact forces from the loads being conveyed, for example, plywood and tri-wall corrugated paperboard. The front wall 3 is provided with a wall portion 18, a first flange portion 19 at the base of the wall portion 18 and a second flange portion 20 at the top of the wall portion 18. The wall portion 18 is sized to substantially the cross section load area within the truck trailer body 1. The first flange portion 19 is secured to the conveyor belt 7 of the conveyor belt floor assembly 2 in any suitable manner, so also, the second flange portion 20 is secured to the pulley belt 16 of the overhead pulley assembly 4 in any suitable manner, for example, by a bolt 20' as shown. These securements provide for movement of the front wall 3 when the motor 6 is actuated.

In operation the front wall 3 is positioned near the tail end of the truck trailer body 1 and the freight to be shipped is loaded on the conveyor belt 7 and placed against the front wall 3. As successive loads are placed on the conveyor belt 7, the conveyor belt floor assembly 2 is actuated by the motor 6 to move in a direction away from the tail end of the truck trailer body 1. This also causes the overhead pulley assembly 4 and front wall 3 to move in the same direction thereby providing more loading space. Since the front wall 3 remains in contact with the initial load, it prevents the toppling of the load during movement of the conveyor belt 7 during loading operations or during transit of the loads when the truck trailer body 1 is not fully loaded.

Referring next to FIGS. 4 to 7, a truck trailer body 21, according to a modification of the invention, is provided with a conveyor belt floor assembly 22, a horizontally movable front wall 23, a pair of sidewall pulley assemblies 24, a pair of drive chains 25 and a motor 26.

The conveyor belt floor assembly 22 has an endless conveyor belt 27 which extends almost the entire length of the truck trailer body 1 and which is rotatably mounted in a suitable manner on drive rollers 28, 29, one at each end thereof, respectively. Each drive roller 28, 29 is journalled at its ends in any suitable manner to the truck trailer body 1. In order to provide a proper support for the loaded portions of the conveyor belt 27, the conveyor belt 27 slides along the floor 30 of the truck trailer body 1. Therefore, the floor 30 is made to provide a suitable slide surface for the conveyor belt 27. This can be accomplished by using woods having suitable anti-friction properties or by treating the floor with silicones.

The conveyor belt floor assembly 22 is driven by means of the motor 26 which is mounted on the truck trailer body 1 and actuated in a manner similar to that shown in FIGS. 1 to 3. The motor 26 is connected to the front end roller 28 in a manner similar to the connection of FIGS. 1 to 3.

Figure 7:
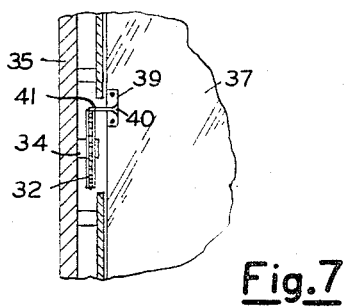
FIG. 7 is an enlarged view showing the attachment of the front loading wall to the side guides and supports.

Each side wall pulley assembly 24 comprises a pair of rotatable sprockets 31, 32 and an endless drive chain 33 mounted around the sprockets 31, 32. Each sprocket is suitably mounted by a support member 34 on the wall 35 of the truck trailer body 1. As shown in FIG. 7, the sprocket 32 is positioned within a recess in the wall 35 so that the sidewall pulley assemblies 24 will not interfere with the freight handled by the truck trailer.

Figure 6:
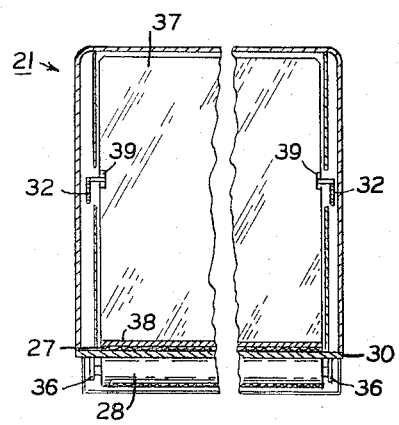
FIG. 6 is a partial transverse view taken at line 6—6 of FIG. 4.

Each drive chain 25 is suitably mounted on the front end roller 28 of the conveyor belt floor assembly 22 and the front end sprocket 31 of the sidewall pulley assembly 24 in a manner so that it effects movement of the conveyor belt 27 and pulley drive chain 33 simultaneously upon actuation of the motor 26. As shown in FIG. 6, the front end roller 28 has suitable sprockets 36 at its ends which drive the drive chains 25.

The movable front wall 23 which is made of a material similar to the front wall of FIGS. 1 to 3, comprises a wall portion 37 and a flange portion 38. The flange portion 38 can either be secured to or independent of the conveyor belt 27. However, the wall portion 37 is provided with a pair of brackets 39, one on each side, which are secured thereto by suitable fasteners, such as screws. Each bracket 39 is provided with a stem 40 which carries a projection 41 at its outer end. The projection 41 is sized to fit within the top portion of the drive chain 33 so that movement of the drive chain 33 causes movement of the front wall 23 in the same direction.

The operation of the front wall 23 during loading is similar to the operation of the front wall of FIGS. 1 to 3, as above described.

It is noted that the front walls of the invention need not be actuated by a chain drive from an electric motor. The movement of the front walls can be accomplished by a pair of hydraulic pistons installed near the tail-end of the truck trailer body. The hydraulic pistons can be operated in synchronism with the conveyor belt floor system so that the front walls are pushed back along with the conveyor belt when a freight load is placed in the truck trailer.

Figure 8:
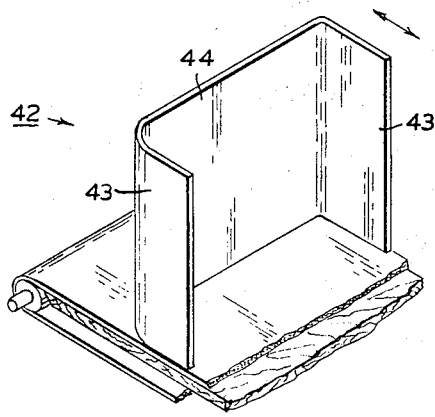
FIG. 8 is a fragmentary isometric view showing an alternately shaped movable front loading wall.

Referring to FIG. 8, a movable front wall 42 can be provided with a pair of wing walls 43 extending from a wall portion 44 so as to impart a greater degree of rigidity to the structure. This front wall 42 can be utilized in either of the modifications set forth above and shown in FIGS. 1 to 7.

Figure 9:
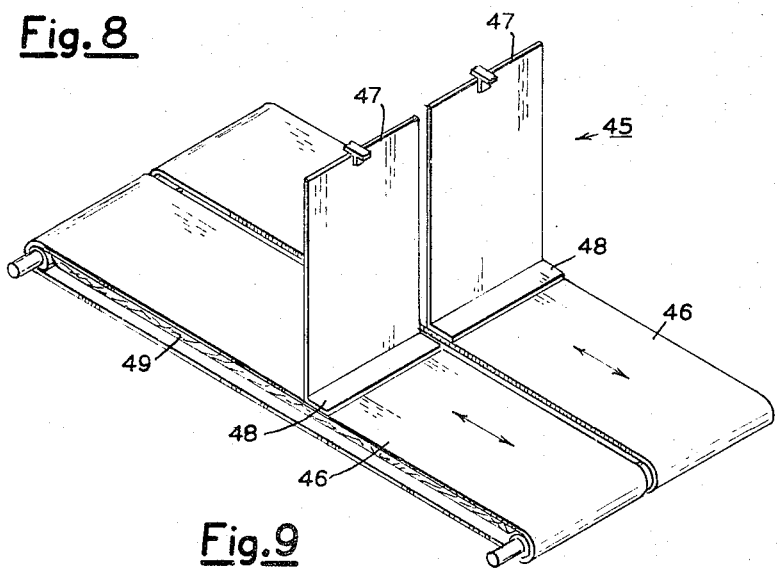
FIG. 9 is an isometric view of another alternate truck trailer movable front wall arrangement.

Referring finally to FIG. 9, a split front wall and conveyor belt assembly 45 is provided for use with the truck trailer body of FIGS. 1 to 3 or FIGS. 4 to 7 so that one half of the truck trailer may be loaded without loading the other half of the truck trailer. The split assembly 45 comprises two conveyor belt floor assemblies 46 which each mount a front wall 47 thereon. The conveyor belt floor assemblies 46 are made and driven in a manner as above set forth. The front walls 47 are each provided with a flange portion 48 which can be secured to or independent of the conveyor belt floor assembly 46. However, the front walls 47 are provided with suitable brackets which connect to an overhead pulley assembly similar to that as above described.

As shown in FIG. 9, the truck trailer is provided with a suitable floor 49, as above described, which will support the loads on the conveyor belt floor assembly 46 and allow the conveyor belt to slide thereon.

In order to operate the individual floor assemblies 46 independently of each other, any suitable clutch means can be provided between them so that only one motor means need be used as above described.

While the invention has been specifically described as embodied in a truck trailer body, it is to be understood that any other freight handling vehicle can embody the invention. For example the invention can be used in an airplane which carries freight.

While the invention is thus described, it is not wished that it be limited to the precise details described, as changes may be readily made within the scope of the claims without departing from the spirit of the invention.

What is claimed is:

1. In combination a freight handling device having a roof, a movable endless conveyor floor for receiving and conveying freight thereon, load supporting means positioned transversely within said endless conveyor floor for supporting the freight received on said endless conveyor floor, a stationary front wall, a pair of side walls, endless chain means longitudinally disposed above said endless conveyor floor and mounted from said roof and a means for activating said movable endless conveyor floor and said endless chain means in synchronism, and a movable front wall positioned between said side walls and connected to said endless chain means and said endless conveyor floor whereby said movable front wall can be adjustably positioned with respect to said stationary front wall.

2. The combination as set forth in claim 1 wherein said load supporting means includes a series of load supporting rollers journalled in each of said side walls.

3. The combination as set forth in claim 1 wherein said load supporting means includes a floor having a slide surface thereon to slidably support said endless conveyor floor.

4. In combination a freight handling device having a roof, a floor, a stationary front wall, a pair of opposed side walls, a rear wall and an endless chain means longitudinally mounted above said floor; a movable front wall positioned between said side walls having at least one wall portion perpendicular to said floor, an upper flange portion extending from the upper portion of said wall portion connected to said endless chain means for simultaneous movement therewith, and a lower flange portion extending from the base of said wall portion; an endless conveyor belt means below said endless chain means having an upper surface for receiving and conveying freight slidably supported on said floor; and means for moving said conveyor belt and said endless chain simultaneously.

5. The combination as set forth in claim 4 wherein said movable front wall includes a pair of wing wall portions tending from said wall portion.

6. The combination as set forth in claim 4 wherein said movable front wall comprises two wall portions.

References Cited

UNITED STATES PATENTS

| | | | |
|---|---|---|---|
| 2,514,843 | 7/1950 | Clement | 214—83.22 |
| 2,679,941 | 6/1954 | Roesies | 214—83.22 |
| 2,909,295 | 10/1959 | Weir | 214—82 |
| 2,912,129 | 11/1959 | Varrone | 214—82 |
| 3,173,564 | 3/1965 | Mayo | 214—83.36 X |

FOREIGN PATENTS

| | | |
|---|---|---|
| 529,551 | 11/1940 | Great Britain. |

GERALD M. FORLENZA, *Primary Examiner.*

ALBERT J. MAKAY, *Examiner.*